United States Patent [19]

Schad et al.

[11] Patent Number: 4,522,581
[45] Date of Patent: Jun. 11, 1985

[54] SYSTEM FOR HANDLING PARTLY FINISHED WORKPIECES

[75] Inventors: Robert D. Schad, Toronto; Herbert Rees, Willowdale, both of Canada

[73] Assignee: Husky Injection Molding Systems Ltd., Bolton, Canada

[21] Appl. No.: 648,793

[22] Filed: Sep. 7, 1984

[51] Int. Cl.³ .............................................. B29C 17/07
[52] U.S. Cl. ..................................... 425/534; 425/326
[58] Field of Search .................... 425/526, 534, 541; 264/535

[56] References Cited

U.S. PATENT DOCUMENTS

| | | | |
|---|---|---|---|
| 3,283,046 | 11/1966 | DeWitt et al. | 425/534 X |
| 3,321,564 | 5/1967 | Dobbins et al. | 425/534 X |
| 3,339,230 | 9/1967 | Farrell | 425/526 |
| 4,313,905 | 2/1982 | Hafele | 425/526 X |
| 4,354,813 | 10/1982 | Collombin | 264/535 X |
| 4,362,498 | 12/1982 | Harry et al. | 264/535 X |
| 4,426,202 | 1/1984 | Krishnakumar et al. | 425/534 |
| 4,435,146 | 3/1984 | Wiatt et al. | 425/534 |

Primary Examiner—J. Howard Flint, Jr.
Attorney, Agent, or Firm—Karl F. Ross; Herbert Dubno

[57] ABSTRACT

In an integrated system, plastic articles are produced in a pressure-molding machine and transferred therefrom to pallets at a receiving station. These pallets are entrained by a first branch of a conveyor which carries them through a temperature-conditioning station to an aftertreatment station in which a finishing operation such as blow-molding is performed upon the articles by a mold with which each pallet is temporarily consolidated. The pallets subsequently carry the finished articles to a discharge station and, upon their removal, are returned empty by a second conveyor branch to the receiving station.

20 Claims, 5 Drawing Figures

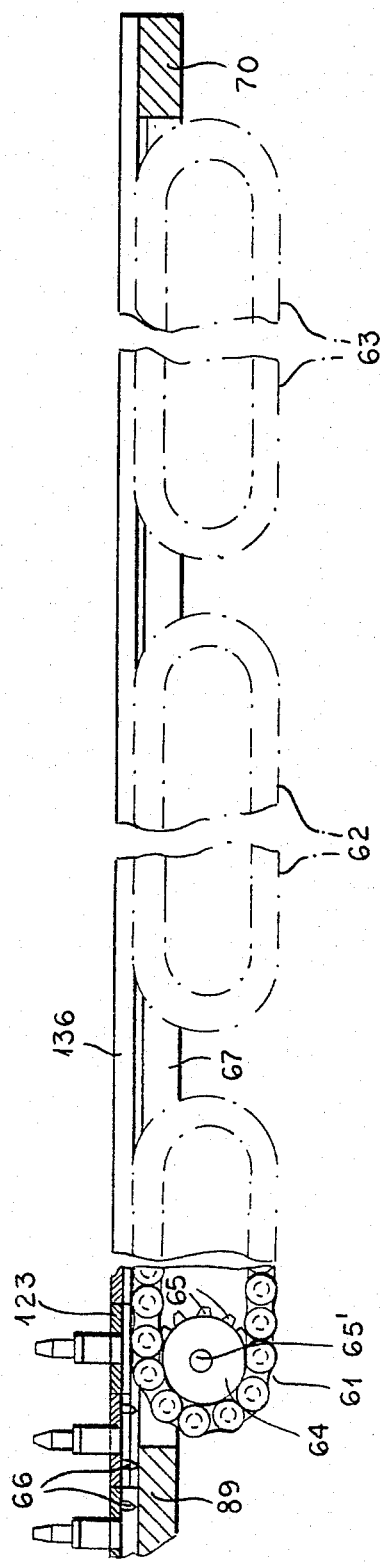

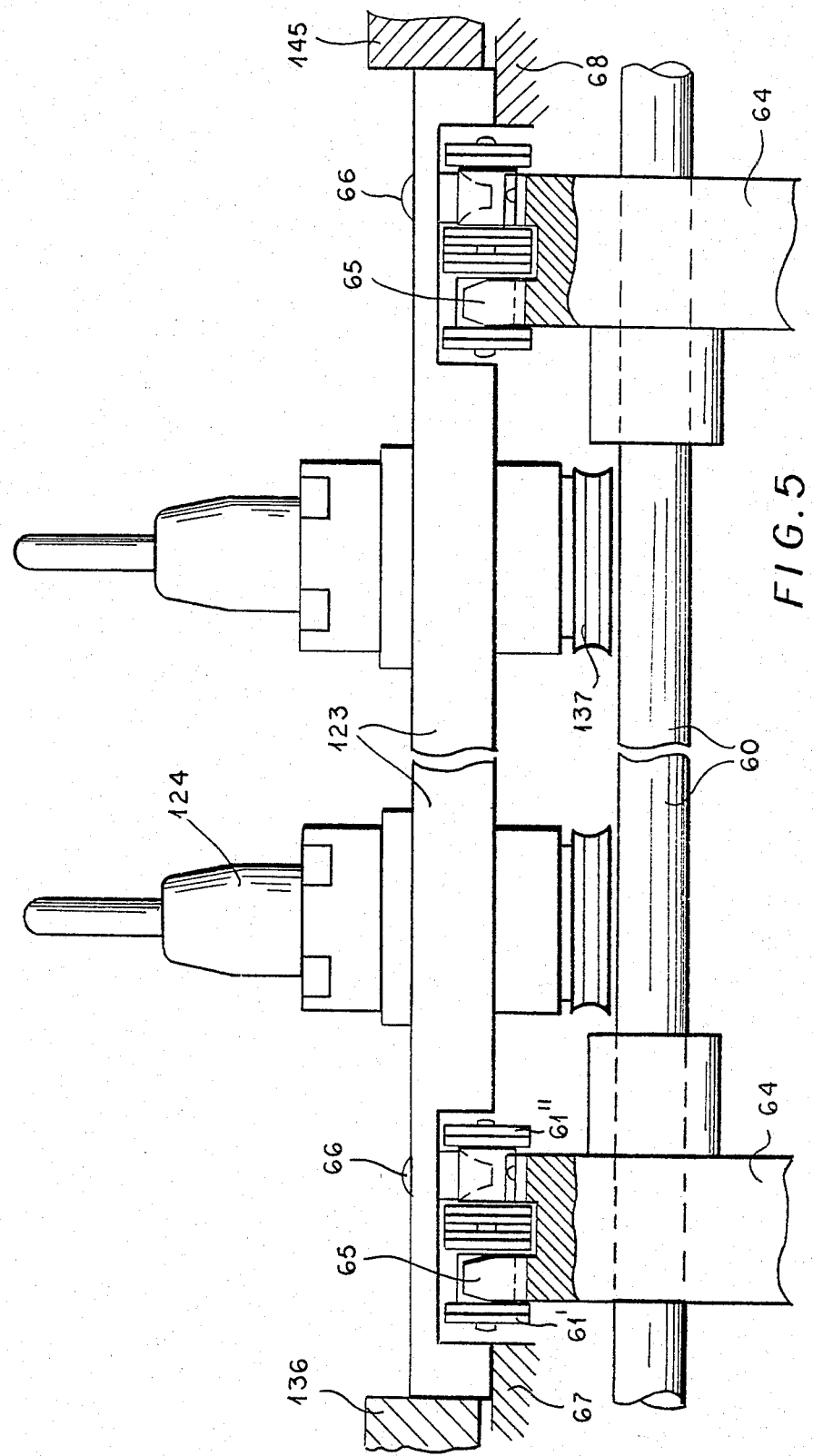

SYSTEM FOR HANDLING PARTLY FINISHED WORKPIECES

FIELD OF THE INVENTION

Our present invention relates to a system for producing, by injection or compression molding (collectively referred to as pressure molding), partly finished workpieces which are transferred sequentially to one or more aftertreatment stations for the performance of secondary operations thereon. In particular, the workpieces may be parisons of polymeric material and the secondary operations may be a thermal conditioning thereof followed by their transformation into hollow articles, such as containers, by blowing with or without mechanical stretching.

BACKGROUND OF THE INVENTION

A system for conveying parisons or preforms by means of pallets into and out of a blow-molding station has been described in U.S. Pat. No. 4,426,202 to Krishnakumar et al. According to that patent, the parisons or preforms presumably molded at a remote location are carried in groups on rotatable collets of roller-supported pallets which move on a track to the blow-molding station where each parison is introduced between two open mold halves, subsequently closing therearound for transforming same into bottles. During the blow and briefly thereafter, the parisons and the bottles formed therefrom remain attached by their necks to the collets of their pallets which, however, do not otherwise participate in the blow-molding operation. On the contrary, as expressly stated in the patent, the support of the preforms—i.e. the engagement of their flanges for holding them in position—is transferred from the pallet to the blow mold during the blowing operation. Nothing is said about where or how the pallets, which are separated from their track after the blow, are loaded and unloaded.

OBJECTS OF THE INVENTION

A major object of our present invention is to provide an efficiently operating system for the continuous recirculation of a sufficient number of pallets between a receiving station, at which they are to be loaded with workpieces yet to be finished, and one or more aftertreatment stations for further handling and finishing.

Another object is to provide a system of this nature in which the loading of the pallets with newly arriving workpieces, their transportation to the aftertreatment stations, their handling in the latter stations and the return of the pallets to the receiving station are precisely synchronized with one another and with the source of the workpieces, e.g. and injection-molding machine, to provide the desired high degree of efficiency.

It is also an object of our invention to provide an improved pallet structure for a system of this type which enables accurate location and secure retention of each parison in a finishing station, particularly in a blow-molding station in which it is inflated with or without the use of a stretching rod.

A more particular object of our invention is to synchronize the operation of a premolding apparatus, specifically an injection-molding machine, with those of a temperature-conditioning and a blow-molding station, having regard to the fact that an operating cycle of the latter station is considerably shorter that that of an injection-molding machine so that the difference in timing has to be taken into account. Since the overall number of available pallets will normally be limited, our invention further aims at insuring a return of unloaded pallets to the loading point in time for having them receive the newly arriving partly finished workpieces in keeping with the cycle of the injection-molding machine.

SUMMARY OF THE INVENTION

Pursuant to one aspect of our invention, a system for handling partly finished workpieces periodically arriving at a receiving station for transportation to one or more aftertreatment stations, including a finishing station, comprises presentation means at the receiving station for making the arriving workpieces available to a multiplicity of pallets successively entrainable by conveyor means from the receiving station to the finishing station. Each pallet is provided with holding means for releasably retaining a workpiece available at the presentation means and is further provided with locating means for temporarily consolidating the respective pallet with an operative part of the finishing station to insure the proper positioning of the workpiece with reference thereto. The system further includes unloading means disposed along the path of the conveyor means for removing the finished workpieces from their pallets. The unloading means could be part of the finishing station or disposed in a discharge station downstream therefrom.

In the specific instance where the workpieces are parisons previously molded in a pressure-molding machine, the presentation means may comprise a take-off plate picking up a group of freshly molded parisons for delivery to a number of pallets sufficient to receive them. This will enable the pressure-molding machine to operate in synchronism with the finishing station even though their cycles may be different from each other. When the finishing station comprises a blow mold, designed to convert the parisons into end products such as containers, the locating means of the pallets may be clampingly engaged by coacting extensions of a pair of blow-mold halves during a blowing operation.

Such a pallet, pursuant to another feature of our invention, comprises a body engageable by the conveyor means during transportation, either between flights mounted on the conveyor surface or with the aid of depending formations fitting between chain links of the conveyor. The holding means may comprise one or more rotatable plugs each engageable with a neck of a parison while the locating means may be formed by a socket wherein each plug is journaled for independent rotation. The plug advantageously has a central bore accommodating both a parison-inflating pressure fluid and a parison-stretching core rod at the blow-molding station when the pallet is arrested there by the gripping of its socket between the mold halves.

In accordance with a more particular feature of our invention, the conveyor means may include a first branch moving from the receiving station to the finishing station and a second branch moving from the finishing station to the receiving station, the two branches being interlinked by first transfer means synchronized therewith for moving the pallets from a downstream part of the second branch to an upstream part of the first branch by way of the receiving station, with loading of each passing pallet at the receiving station by at least one newly arrived workpiece, and by second transfer means synchronized therewith for moving the pallets from a downstream part of the first branch to an upstream part of the second branch by way of the finishing station, with unloading of each passing pallet ahead of the second branch.

It is often desirable to let the freshly molded parisons, still hot except at their neck, traverse a tempering chamber on their way to the blow-molding station, i.e. while being entrained by the first conveyor branch. Such a tempering chamber, constituting another aftertreatment station preceding the finishing station, is designed to minimize the loss of heat stored in the body of each parison and, if necessary, to redistribute the heat profile of that body in a manner suitable for the blowing step. Thus, the chamber may be provided with heating and/or cooling means to which each parison ought to be uniformly exposed around its entire periphery. The plugs, therefore, advantageously are rotatably journaled in their pallets and are engageable by drive means for setting them together with their parisons in rotation for such uniform exposure.

If the parisons are produced by an injection-molding machine whose operating cycle lasts n times as long as that of the blow-molding or other finishing station, each injection cycle ought to produce n times as many parisons as can be handled in a single finishing cycle. The latter number preferably equals the number of parisons transportable by one pallet so that n pallets should be loaded simultaneously at the receiving station but are to be successively moved into the finishing station. Preferably, an ejection or discharge station immediately following the last aftertreatment—e.g. the blowing—station is used for the unloading of each pallet with the aid of air, some other fluid under pressure or suction, or mechanical means introduced from below into the parison necks so as to dislodge the end products from the pallets. These end products could also be removed from the pallets directly at the last aftertreatment station, if desired.

BRIEF DESCRIPTION OF THE DRAWING

The above and other features of our invention will now be described in detail with reference to the accompanying drawing in which:

FIG. 4 is a side-elevational view of an alternate type of conveyor usable in our present system; and FIG. 5 is a fragmentary end view, partly in section, of the conveyor shown in FIG. 4.

SPECIFIC DESCRIPTION

Figure 1:
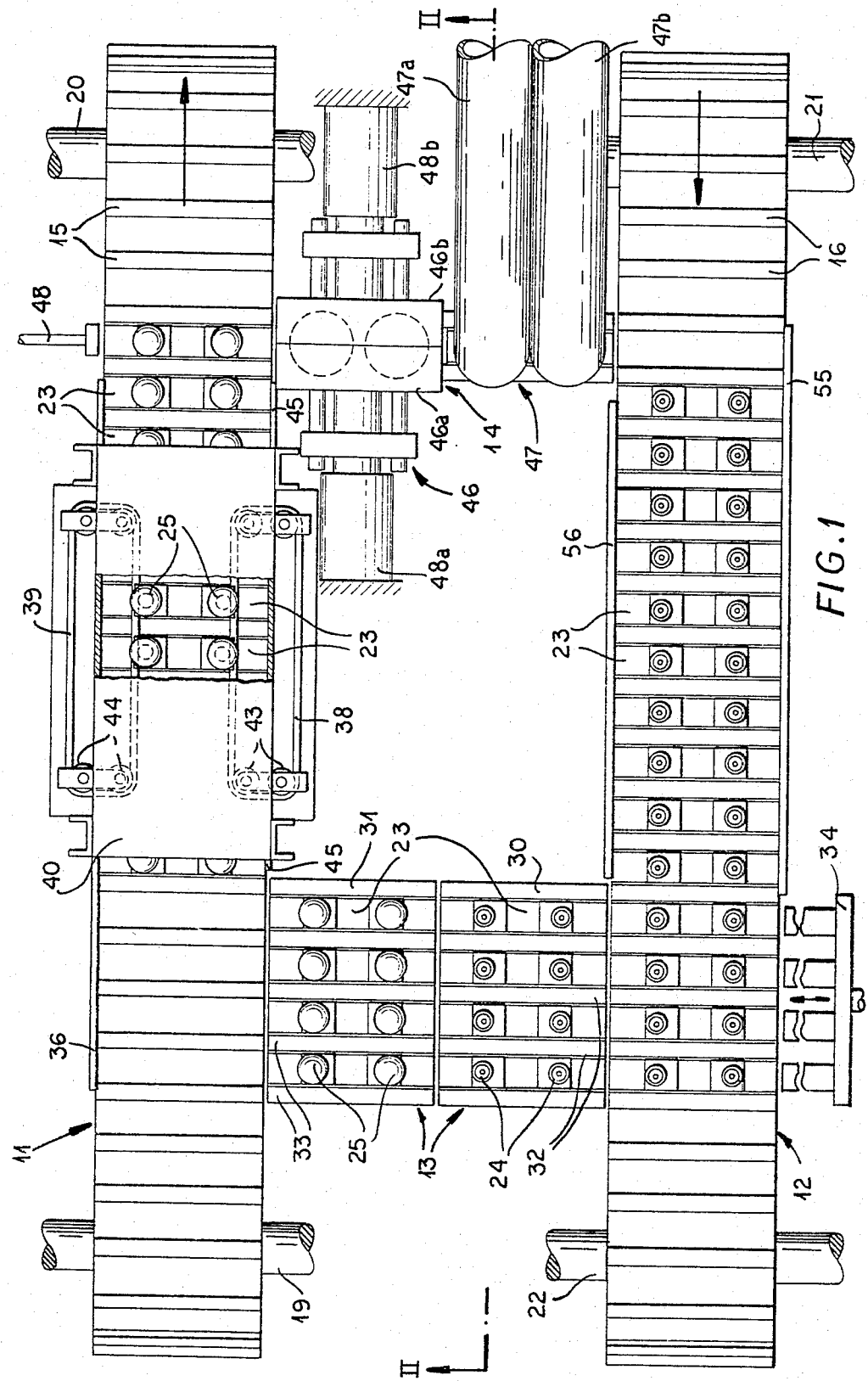
FIG. 1 is a top view of a transportation system according to our invention, serving for the conveyance of freshly molded parisons available at a receiving station to a tempering chamber and then to a blow-molding station by means of pallets and for the return of the empty pallets to the receiving station.
Figure 2:
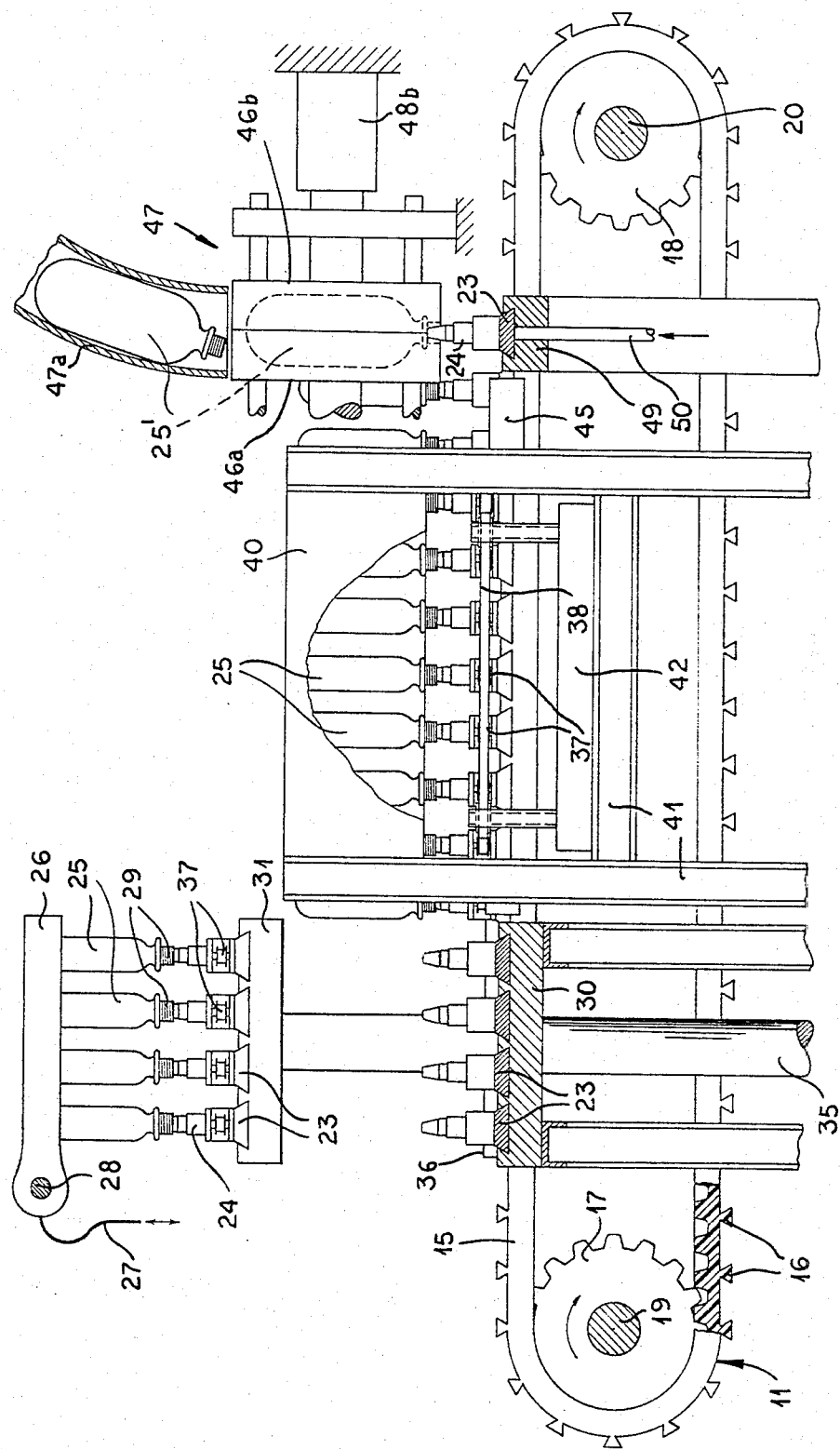
FIG. 2 is a cross-sectional view of the system, taken on the line II—II of FIG. 1.

The system for the production, transportation and finishing of parisons shown in FIGS. 1 and 2 as a representative embodiment of our invention includes transportation means constituted by two parallel conveyor branches 11, 12 and transfer paths 13 and 14 perpendicular thereto. Each conveyor branch 11, 12 comprises an endless belt 15 provided with equispaced flights 16 as best illustrated for branch 11 in FIG. 2. As also illustrated for branch 11 in FIG. 2, the belt 15 is wound about an upstream sprocket 17 and a downstream sprocket 18 carried by shafts 19 and 20. Other shafts 21 and 22 are respectively keyed to an upstream sprocket and a downstream sprocket of branch 12, at least one shaft of each branch being coupled with a nonillustrated intermittently operating drive displacing their belts in mutual synchronism but in opposite directions. Thus, the upper run of belt 15 of branch 11 moves from left to right, as viewed in FIGS. 1 and 2, while the corresponding run of the other branch moves from right to left.

Figure 3:
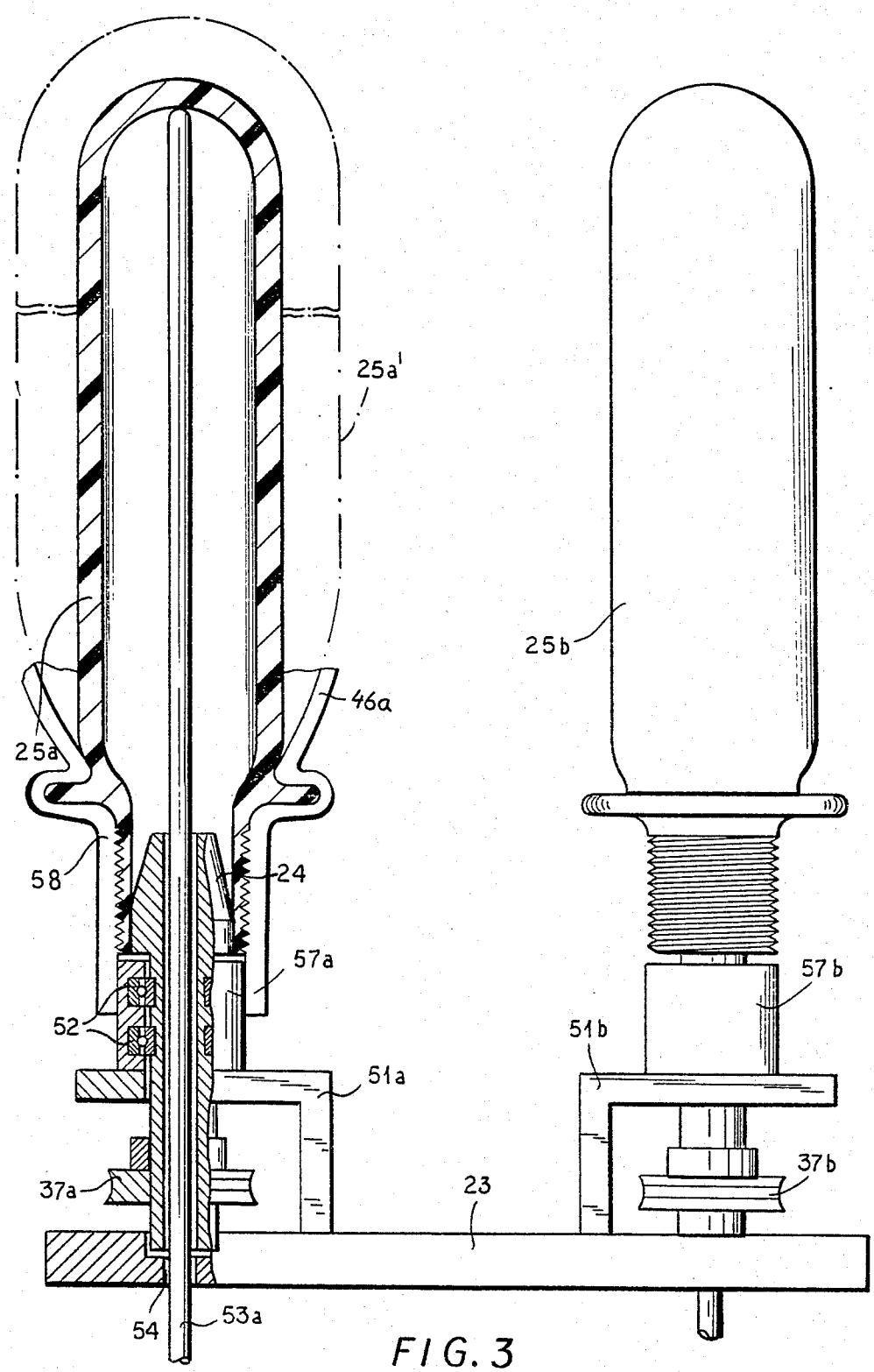
FIG. 3 is a side-elevational view, partly in section and drawn to a larger scale, of a pallet carrying two parisons about to be finished in the blow-molding station.

The beveled flights 16 of each band are designed to accommodate respective pallets 23 fitting closely into the intervening spaces. Each pallet, as more fully described hereinafter with reference to FIG. 3, is provided with one or more (here two) upstanding plugs 24 designed to receive parisons 25 which are produced in an injection-molding machine (not shown) mounted at an elevated level above transfer path 13. That machine produces, during each of its operating cycles, a multiplicity of parisons 25 (here eight), to be received by a suitable number of pallets, which are extracted from between its mold portions by a take-off plate 26 as described, for example, in commonly owned U.S. Pat. No. 3,454,991. In its original retrieval position, plate 26 confronts four rows of two cores each on one of the spaced-apart mold portions on which respective parisons 25 have been formed; plate 26 has eight seats in which the closed ends of these parisons are held under suction applied via a tube 27. After the plate 26 with its eight parisons has been extracted from the injection mold, it is swung about a shaft 28 into the horizontal presentation position shown in FIG. 2 in which the parisons are vertical with neck portions 29 hanging down.

Transfer path 13 comprises a stationary platform 30 and an elevatable platform 31 in series with each other, platform 31 and take-off plate 26 together constituting a receiving station. Each of these platforms is of rectangular outline and of a width (in the direction transverse to the conveyor motion) sufficient to accommodate the length of a pallet. A set of five flights 32, 33 on these platforms, of the same profile as the conveyor flights 16, are aligned with one another and with respective flights 16 at a particular instant when branches 11 and 12 are briefly halted; the aligned flights define four parallel tracks. At such an instant a 4-pronged pusher 34 is thrust into the last pallet-containing interflight gaps of branch 12 to move the pallets thereof into corresponding gaps of platform 30 while dislodging the pallets previously seated therein into aligned gaps of platform 31 which in that part of a cycle is coplanar with platform 30 and the upper runs of branches 11, 12. Alternate ways to engage pallets 23 with the conveyor branches, which do not require halting same for loading, are available as discussed hereinafter with reference to FIGS. 4 and 5 and are usable in the system of our present invention. Platform 31, mounted atop a vertically reciprocable piston rod 35 of an otherwise nonillustrated fluidic jack, is then raised to an elevated level (FIG. 2) so that the four empty pallets now present thereon approach the take-off plate 26 horizontally overlying same at this moment. The plugs 24 of the four pallets thereupon engage the necks of the parisons depending from plate 26 while the suction retaining the parisons on that plate is released. Upon the immediately following descent of the platform 31 with its loaded pallets, the latter are aligned with four empty gaps of branch 11 which has advanced by four steps since the last four pallets were received thereon from platform 31 by the aforedescribed thrust of pusher 34. The same four steps have also brought a new set of pallets on branch 12 into line with platforms 30 and 31 so that a new thrust of pusher 34 will shift the pallet sets from branch 12, platform 30 and platform 31 to platform 30, platform 31 and branch 11, respectively. Meanwhile, another injection-molding cycle has been completed and take-off plate 26 has been reinserted between the reopened mold portions to pick up a new set of parisons 25 even as the pallets carrying the previously extracted parisons are advanced by conveyor branch 11 to the right as viewed in FIGS. 1 and 2. A ledge 36 at the far edge of branch 11 prevents the oncoming pallets from overshooting the conveyor band.

As seen in FIG. 1 the pallets each have a longitudinal axis perpendicular to the direction of conveyor motion. Naturally, we could readily align the pallets so that they will be carried by the conveyor with their longitudinal axis parallel to the direction of travel, e.g. to transport a single row of preforms.

The plugs 24, which are rotatably journaled in their pallets as more fully described hereinafter with reference to FIG. 3, carry pulleys 37 which are accessible from opposite ends of each pallet for engagement by a pair of endless belts 38, 39 disposed underneath a tempering chamber 40 overlying the conveyor branch 11. Chamber 40 has an at least partly open entrance end admitting the two rows of parisons entrained by that branch. Only the portions of the parisons that are to be heat-treated, however, pass through the chamber while the ones that are not to be tempered, e.g. the necks 29, project through bottom slots of the chamber so as to be continuously exposed to the atmosphere. A frame 41 supporting the chamber 40 carries a driving unit 42 which rotates two sets of pulleys 43, 44 embraced by the belts 38 and 39. Through their frictional contact with pulleys 37, these belts turn each parison about its own vertical axis as it passes through chamber 40. It should be noted that, during such passage and thereafter, the pallets are guided by the aforementioned ledge 36 and by another, shorter ledge 45 extending along the opposite edge of branch 11.

Tempering chamber 40 may contain heating and/or cooling elements, not shown, to which the continuously rotating parisons 25 are uniformly exposed.

In contradistinction to transfer path 13 with its four parallel tracks, transfer path 14 has only a single track which passes through a finishing station, in this instance a blowing station 46, and an injection station 47. Each of these stations has a length substantially equal to that of a pallet. With the conveyor bands temporarily halted, the last pallet to arrive at the downstream end (right) or branch 11 is thrust by a pusher 48 into blowing station 46 while the pallet previously located there, carrying finished products 25' resulting from the blowing of its parisons, is advanced by the same motion into the ejection station 47 where these finished products, i.e. bottles, are discharged by air pressure as seen in FIG. 2. Alternatively, suction from above could be used for extraction of the products. The pallet previously unloaded in station 47 by this procedure is concurrently shoved into an aligned interflight gap of conveyor branch 12 for return to the downstream end of this branch and recirculation over transfer path 13 with the aid of pusher 34.

Station 46 comprises a blow mold which may be of single-piece construction or, as here shown, composed of two blow-mold halves 46a, 46b which are separable by associated jacks 48a, 48b to make room for a new parison-loaded pallet while letting the pallet carrying previously formed bottles leave the blow mold. As seen in FIG. 2, the pallets traveling on transfer path 14 are guided by a throughgoing rail 49 centered with reference to stations 46 and 47. In principle, however, it is also possible to hold one blow-mold half (e.g. 46a) stationary—at a location withdrawn from that shown in the drawing—and to reciprocate the other half with reference thereto between an open and a closed position, a section of rail 49 being transversely shiftable to let the pallet present in that station move concurrently with the reciprocable mold half (46b) to bring its parisons into the cavities of the stationary half before the blow and thereafter withdraw the final products during the mold-opening stroke to restore the continuity of that rail 49.

Ejection station 47 comprises two discharge tubes 47a, 47b positioned to overlie the two freshly blown bottles on an incoming pallet. Two conduits 50 (only one shown) pass through the rail 49 to the underside of the pallet so as to be respectively aligned with its necks 24 when the pallet comes to rest in station 47. Air under pressure flowing through these conduits lifts the bottles off these necks and drives them through the tubes 47a, 47b into a nonillustrated receptacle or onto an ancillary conveyor.

Pushers 34 and 48 must, of course, be properly synchronized with the stepping motion of the conveyor branches for satisfactory operation of the system as described above.

Reference will now be made to FIG. 3 for a more detailed description of a representative pallet 23. The pallet body carries a pair of brackets 51a, 51b with flanges spacedly overhanging its rectangular base. Plugs 24, serving as holding means respectively engaging two parisons 25a, 25b, have stems journaled by means of ball bearings 52 in sockets 57a, 57b and carry pulleys 37a, 37b, as described above, on their lower extremities. The stems are hollow and, in the blowing station 46, are penetrated by core rods 53a and 53b capable of being thrust up to stretch the parisons axially prior to the admission of fluid pressure thereinto. There is sufficient clearance around these rods to let air under pressure flow into the parisons to expand same against the walls of the corresponding mold cavities as indicated at 25a' for parison 25a. Holes 54 in the pallet, traversed by the stretching rods and the air blasts in station 46, may serve in station 47 for the admission of the ejection air. To align the parison with the cavity formed by the blow-mold halves 46a and 46b in the closed position and to assure that the axes of the parison and the cavity coincide with sufficient accuracy for the production of bottles with negligible circumferential wall-thickness variation, sockets 57a and 57b serving as locators are accurately spaced and machined, and the blow-mold halves contain equally accurate cavity extensions 58. Upon closure of the blow mold, plugs 24 and the pallets carrying them thus effectively form part of the blow mold.

Upon returning from transfer path 14 to transfer path 13 on the reverse branch 12, the pallets 23 are also guided between a pair of stationary ledges 55, 56 as seen in FIG. 1.

In FIGS. 4 and 5 we have schematically illustrated the possibility of using several sequential chain pairs 61, 62, 63 in lieu of the throughgoing conveyor band of, say, branch 11. The chains of each pair are driven by respective sprocket wheels 64 keyed to a shaft 60 coupled with a nonillustrated motor. Each chain is divided into two halves, indicated at 61' and 61" in FIG. 5, respectively passing around an outer half and an inner half of the associated sprocket. One sprocket half carries teeth 65 engaging in the meshes of the corresponding chain half 61'. Similar but oppositely facing teeth 66 depend from the base of a pallet 123 to be entrained, these latter teeth penetrating into the meshes of the other chain half. Pallets 123, with plugs 124 and pulleys 137, are generally similar to those described above and are guided between ledges 136, 145 while riding on shelves 67, 68 flanking the chains.

In this instance, the pallets cannot be transversely loaded onto and unloaded from the conveyors. Thus, a set of four pallets to be entrained by the cascaded chain pairs 61–63 through the tempering chamber 40 and toward the finishing station 46 and the ejector station 47 of FIGS. 1 and 2 will have to be deposited first on a table 69 interconnecting the shelves 67 and 68 ahead of the first chain pair 61 on which these pallets are then thrust by a nonillustrated pusher into engagement with chain pair 61. At the end of this chain pair, the pallets are pushed over an intervening portion of shelves 67, 68 onto chain pair 62 and from there in an analogous manner onto chain pair 63 which discharges them onto a table 70 for further transportation through the finishing station. The middle pair of chains 62 may be used to convey the pallets through the tempering chamber 40 of FIGS. 1 and 2.

With such sequential conveyors it is possible to drive the several chain pairs 61, 62 and 63 at different speeds of optimal exposure of the parisons to the several work stations and to different zone locations within the tempering chamber, with the pallets spaced apart on each chain pair according to its velocity. Typically, the tempering chamber is divided into several such zones, each imparting a different temperature to the parisons, depending on the temperature of the heating or cooling means within each zone and the time of exposure of the parisons thereto. In order to control the effect of these zones upon the parisons, not only their temperature may be varied, as is conventionally done, but also the time of exposure which in many instances is more reliable as a method of control.

We claim:

1. A system for handling partly finished workpieces periodically arriving at a receiving station for transportation to a finishing station, comprising:
    presentation means at said receiving station for making the arriving workpieces available;
    conveyor means moving from said receiving station to said finishing station;
    a multiplicity of pallets successively entrainable by said conveyor means between said receiving and finishing stations, each of said pallets being provided with holding means for releasably retaining a workpiece available at said presentation means and being further provided with locating means for temporarily consolidating the respective pallet with an operative part of said finishing station to ensure the proper positioning of said workpiece with reference thereto; and
    unloading means disposed along the path of said conveyor means for removing the finished workpieces from said pallets.

2. A system as defined in claim 1 wherein said unloading means is disposed in a discharge station downstream from said finishing station.

3. A system as defined in claim 1 wherein said presentation means comprises a take-off member extracting said workpieces from a pressure-molding machine operating in synchronism with said finishing station.

4. A system as defined in claim 1 wherein said finishing station comprises a blow mold.

5. A system as defined in claim 4 wherein said operative part comprises blow-mold means clampingly engageable with said locating means during a blowing operation.

6. A system as defined in claim 5 wherein said blow-mold comprises coacting extensions of a pair of blow-mold halves.

7. A system for handling partly finished workpieces periodically arriving at a receiving station for transportation to a finishing station, comprising:
    conveyor means including a first branch moving from said receiving station to said finishing station and a second branch moving from said finishing station to said receiving station;
    a multiplicity of pallets engageable by said conveyor means for entrainment between said receiving and finishing stations, each of said pallets having holding means for temporarily retaining at least one workpiece arriving at said receiving station;
    first transfer means synchronized with said conveyor means for moving said pallets from a downstream part of said second branch to an upstream part of said first branch by way of said receiving station, with loading of each passing pallet in said receiving station by at least one newly arrived workpiece; and
    second transfer means synchronized with said conveyor means for moving said pallets from a downstream part of said first branch to an upstream part of said second branch by way of said finishing station, with unloading of each passing pallet ahead of said second branch.

8. A system as defined in claim 7 wherein said workpieces are premolded parisons with necks engageable by said holding means, said finishing station being a blowing station provided with at least one pair of relatively displaceable blow-mold halves and with a source of pressure fluid for inflating a parison bracketed by said blow-mold halves, said holding means comprising at least one tubular plug forming a channel for the passage of said pressure fluid from said source through the respective pallet into a parison whose neck is penetrated by a tip of said plug, said tip projecting in said finishing station between said blow-mold halves to enable a clamping of said neck between the latter and said tip during a blowing operation transforming the parison into a final product.

9. A system as defined in claim 8 wherein said plug is substantially vertical, further including a discharge station immediately following said blowing station having conduit means for supplying pressure fluid from below through said plug into the final product carried thereon to dislodge said final product from the pallet.

10. A system as defined in claim 7 wherein the number of workpieces retainable by said holding means on a pallet equals the number of workpieces concurrently processable in said finishing station during an operating cycle thereof, the number of workpieces simultaneously arriving at said receiving station during an interval equaling n times said operating cycle being n times the number of said concurrently processable workpieces, said first transfer means forming n parallel tracks for the simultaneous transfer of as many pallets from said second branch to said first branch.

11. A system as defined in claim 10 wherein the number of concurrently processable workpieces is two, n being equal to four.

12. A system as defined in claim 10 wherein said receiving station is provided with an elevatable platform lifting a group of n simultaneously transferred pallets to a level above said conveyor means at which n fresh workpieces to be loaded onto said group of n pallets arrive during said interval.

13. A system as defined in claim 8 wherein said plug is rotatably journaled in the respective pallet, further comprising a tempering chamber traversed by parisons on pallets entrained by said first branch during passage from said receiving station to said finishing station, and drive means adjacent said chamber with said plug for rotating same about an axis transverse to the path of pallet motion together with the parison carried thereon during passage of the parison through said chamber.

14. A system as defined in claim 7 wherein at least one of said branches comprises a cascade of several independently driven transport elements.

15. A pallet for transporting partly finished workpieces from a receiving station to a finishing station, comprising:
a body engageable by conveyor means moving from said receiving station to said finishing station;
holding means on said body for releasably retaining a workpiece available at said receiving station; and
locating means on said body for temporarily consolidating said body with an operative part of said finishing station to ensure the proper positioning of said workpiece with reference thereto.

16. A pallet as defined in claim 15 wherein said holding means is a plug engageable with a neck of a parison constituting said workpiece and said locating means is a socket wherein said plug is received, said socket being clampingly engageable by blow-mold means forming part of said finishing station.

17. A pallet as defined in claim 16 wherein said plug has a central bore accommodating a parison-stretching core rod at said finishing station along with a parison-inflating pressure fluid.

18. A pallet as defined in claim 16 wherein said plug is rotatably journaled in said socket.

19. A pallet as defined in claim 18 wherein said plug has a stem carrying a pulley for enabling rotation of said plug along with said parison by external drive means.

20. A pallet as defined in claim 16 wherein said plug projects upward from said body.

* * * * *